March 17, 1964 — E. FISCHER — 3,124,836
MOLDING MACHINE
Filed March 14, 1961 — 6 Sheets-Sheet 1
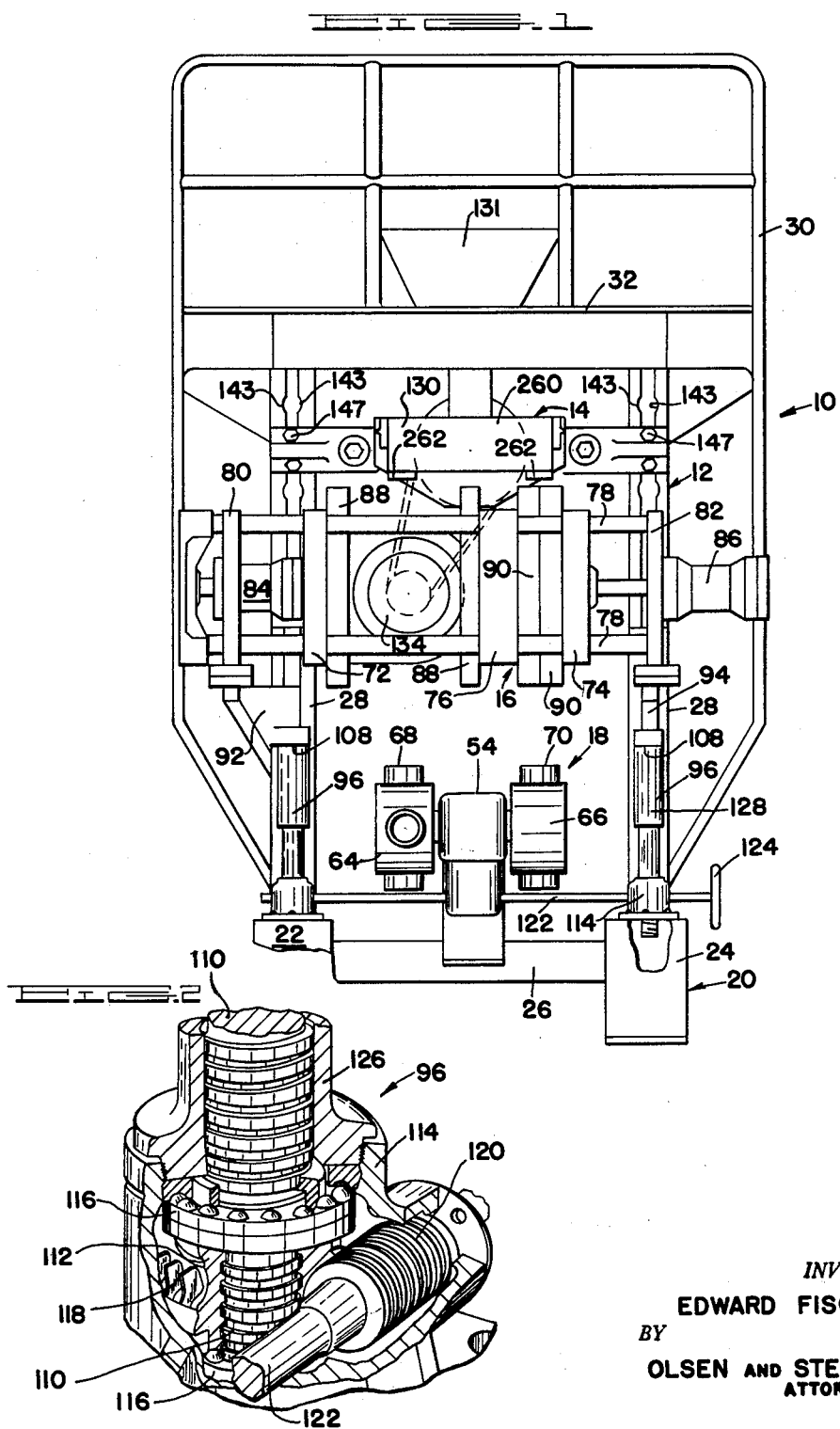
INVENTOR.
EDWARD FISCHER
BY
OLSEN AND STEPHENSON
ATTORNEYS

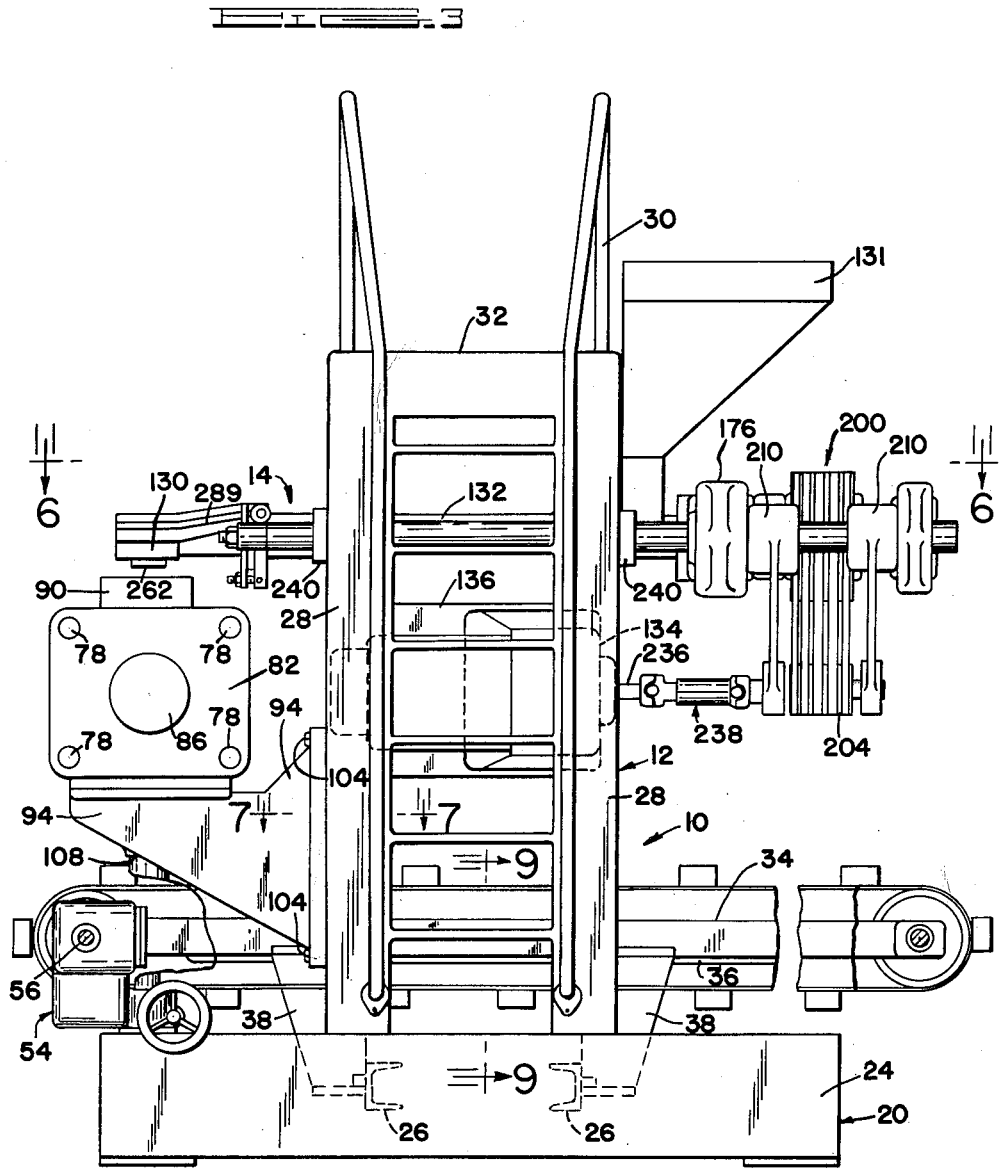

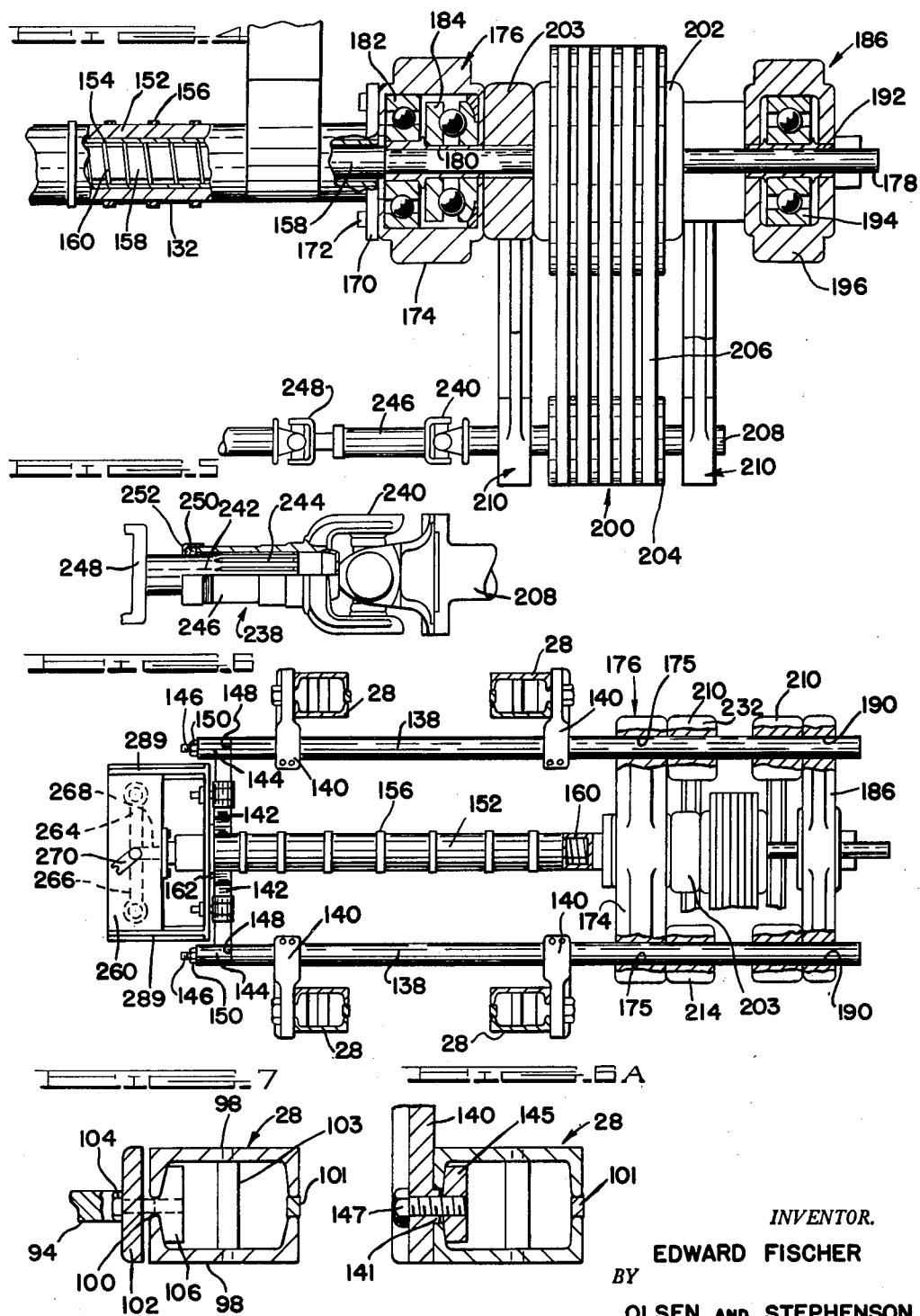

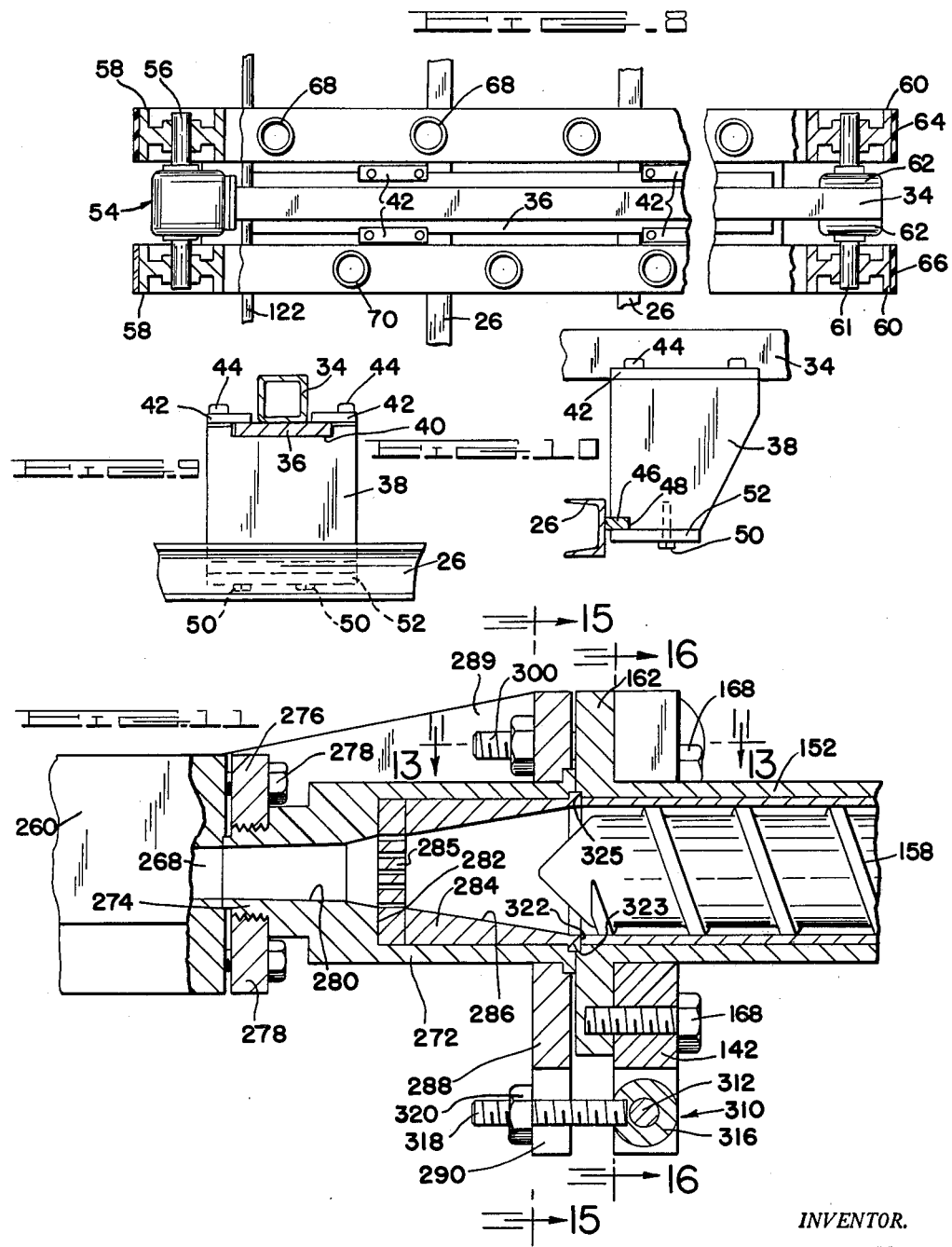

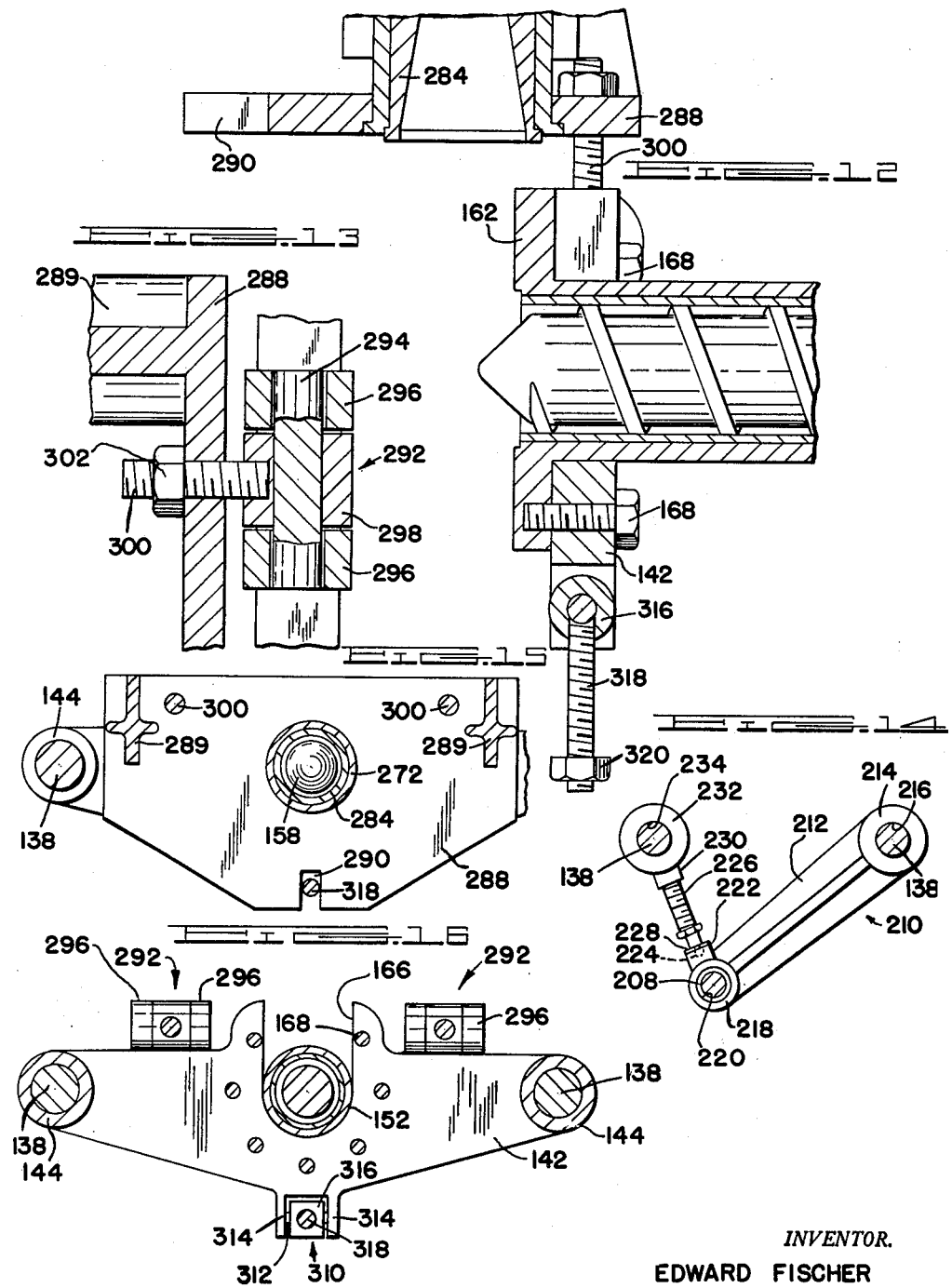

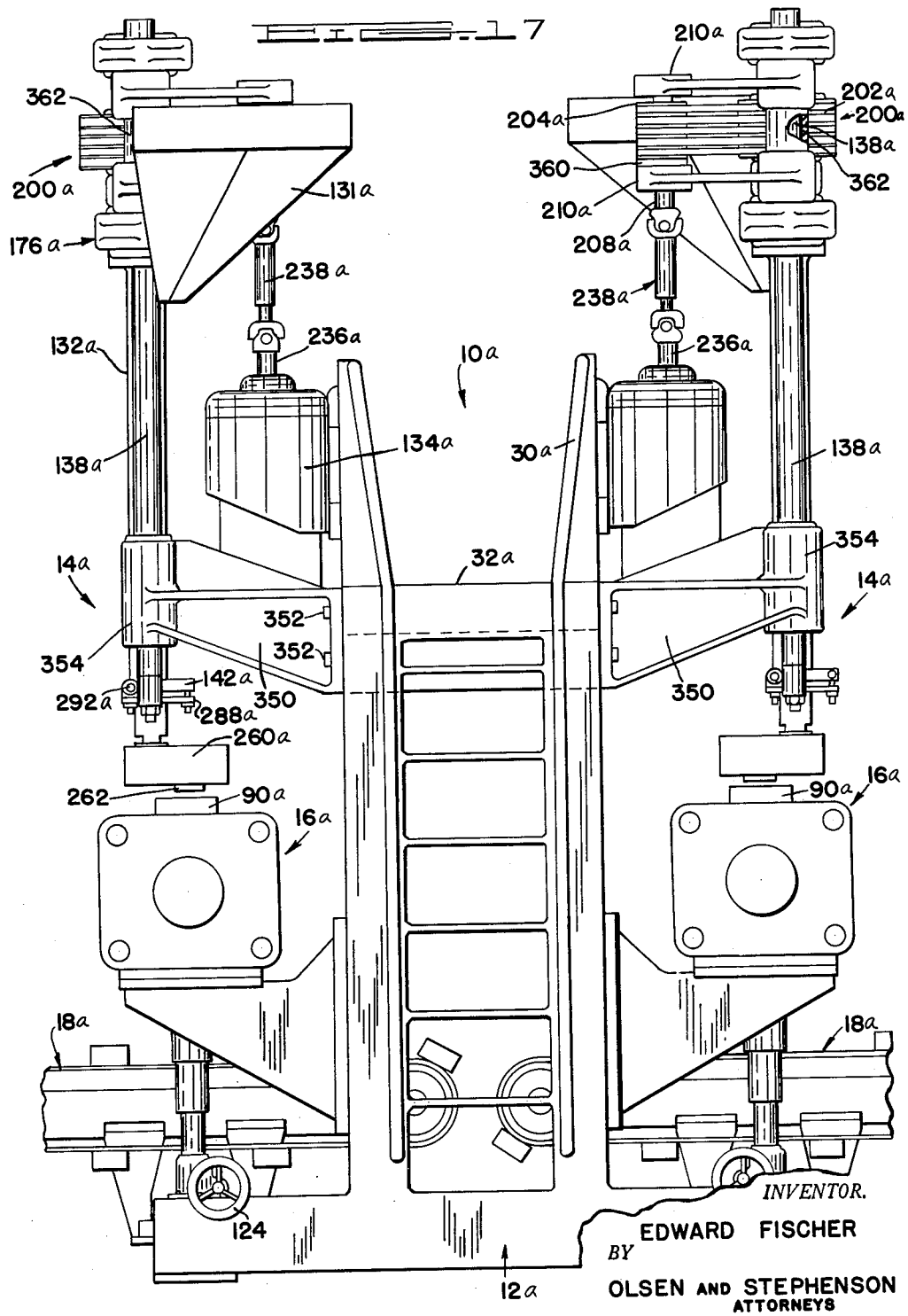

United States Patent Office 3,124,836
Patented Mar. 17, 1964

3,124,836
MOLDING MACHINE
Edward Fischer, Saline, Mich., assignor to Hoover Ball and Bearing Company, Ann Arbor, Mich., a corporation of Michigan
Filed Mar. 14, 1961, Ser. No. 95,730
13 Claims. (Cl. 18—5)

This invention relates generally to molding machines and more particularly to an improved blow molding machine.

Blow molding machines are often used in large numbers to produce hollow plastic parts such as bottles and the like in large quantities. Consequently, a blow molding machine which occupies a minimum of floor space is desirable because it reduces the total floor space required for a large number of machines. In this connection, individual conveyors, for conveying the formed plastic parts away from each machine, are also desirable because they allow each machine to be operated independently so that a single conveyor failure does not affect all of the machines, and a chamber or zone for cooling or otherwise treating a molded part from the machine can be associated with each conveyor. Another desirable feature in machines of this type is a single extruder and die head assembly which can be installed on different machine frames so that the machines can be adapted to available factory space. It is an object of this invention, therefore, to provide an improved blow molding machine which is adaptable to different machine frames so that the machines can be installed in available factory space, is provided with an individual adjustable conveyor and includes a vertically adjustable platen assembly to adapt the machine to the molding of different size plastic parts.

A further object of this invention is to provide a blow molding machine in which the die head is fixed on the frame and the extruder assembly which supplies heated plastic to the die head is mounted so that when it expands and contracts it does not affect the fixed position of the die head on the machine frame.

Still a further object of this invention is to provide a blow molding machine in which the extrusion nozzles, molds, and conveyors are arranged in vertical alignment and this aligned relationship is not affected by heating and cooling of the parts of the machine which supply plastic to the die head.

Another object of this invention is to provide a blow molding machine in which the die head is mounted so that it is readily movable to a position in which is can be cleaned and the parts thereof replaced without affecting its centered position with respect to the molds and the conveyors.

Still another object of this invention is to provide a blow molding machine which is relatively simple in construction, economical to manufacture and can be readily set up and operated to produce hollow plastic parts.

Further objects, features and advantages of this invention will become apparent from a consideration of the following description, the appended claims, and the accompanying drawing in which:

FIGURE 1 is a fragmentary front elevational view of the blow molding machine of this invention;

FIGURE 2 is a fragmentary perspective view of a portion of the platen raising and lowering mechanism in the machine of this invention, with some parts broken away and other parts shown in section for the purpose of clarity;

FIGURE 3 is a side elevational view of the machine of this invention, with some parts broken away to better illustrate the conveyor drive mechanism;

FIGURE 4 is a fragmentary side elevational view of the extruder drive mechanism in the machine of this invention, with some parts broken away and other parts shown in section for the purpose of clarity;

FIGURE 5 is an enlarged elevational view of the connecting shaft assembly in the extruder drive assembly in the machine of this invention;

FIGURE 6 is a horizontal sectional view of the machine of this invention looking substantially along the line 6—6 in FIG. 3;

FIGURE 6A is an enlarged view of a portion of FIG. 6;

FIGURE 7 is an enlarged detail sectional view looking substantially along the line 7—7 in FIG. 3;

FIGURE 8 is a foreshortened plan view of the conveyor for formed plastic parts in the molding machine of this invention;

FIGURE 9 is a sectional view of the conveyor supporting structure in the machine of this invention, looking substantially along the line 9—9 in FIG. 3;

FIGURE 10 is a fragmentary side view of a portion of the conveyor supporting structure in the machine of this invention;

FIGURE 11 is a longitudinal sectional view of a portion of the die head and extruder assembly in the machine of this invention, showing the die head clamped in its operative position;

FIGURE 12 is a longitudinal sectional view of a portion of the die head and extruder assembly in the machine of this invention, illustrated similarly to FIG. 11 and showing the die head moved to an inoperative position for cleaning and repair;

FIGURE 13 is a detail sectional view of a die head pivot support looking substantially along the line 13—13 in FIG. 11;

FIGURE 14 is a front elevational view of a shaft support in the extruder drive mechanism;

FIGURES 15 and 16 are reduced transverse sectional views illustrating details of the die head mounting structure in the machine of this invention, looking substantially along the lines 15—15 and 16—16, respectively, in FIG. 11; and FIGURE 17 is a side view of a modified form of the machine of this invention.

With reference to the drawing, the blow molding machine of this invention, indicated generally at 10, is illustrated in FIGS. 1 and 3 as including a main frame 12, a die head and extruder assembly 14 mounted on the main frame 12, a mold carrying platen assembly 16, and a conveyor 18 which receives molded plastic parts and transports them to another location. The main frame 12 consists of a base 20 having a pair of hollow side portions 22 and 24 connected by cross beams 26. Four upright columns 28 are rigidly mounted on the base 24 and extend upwardly therefrom to a position above the extruder and die head assembly 14. An inverted U-shape ladder and platform unit 30 is mounted on the columns 28 and includes a platform 32 which extends transversely across the frame 12 at a position above the die head and extruder assembly 14.

The conveyor 18 consists of an elongated backbone frame member 34 (FIGS. 3, 8 and 9) which is secured on its underside to a flat plate 36 which extends lengthwise of the backbone 34. A pair of upright support members 38 are formed in their upper ends with recesses or grooves 40 of a size to slidably support the plate 36 as shown in FIG. 9. A pair of clamp bars 42 are secured to the upper ends of each of the support members 38 by bolts 44 so that they project over the upper ends of the grooves 40 and are operable to clamp the plate 36 in an adjusted position on the support members 38. When the bolts 44 are loosened, the backbone 34 may be adjusted longitudinally of the conveyor 18 to a desired position and then clamped in that position by tightening the bolts 44.

Each of the cross frame members 26 is provided with a transverse projection 46 which extends into a recess 48 in one of the support members 38 as shown in FIGS. 3 and 10 so that the position of the conveyor 18 can be adjusted in a direction transversely thereof by sliding the support members 38 on the projections 46. The support members 38 are clamped in an adjusted position by tightening bolts 50 which secure clamp plates 52 to the lower end of the support members 38 so that the clamp plates 52 are engageable with the projections 46. It can thus be seen that the position of the backbone 34 is readily adjusted to locate the conveyor 18 at a desired position on the frame 12.

At its front end, the backbone 34 supports a gear motor 54 (FIGS. 1 and 3) which is operable to drive a shaft 56 that extends horizontally in a direction transversely of the backbone 34. As shown in FIG. 8, the shaft 56 is secured on opposite sides of the motor 54 to a pair of hubs or drums 58. A second set of hubs or drums 60 are secured to a shaft 61 which is rotatably mounted in pillow blocks 62 carried by the rear end of the backbone 34. A first endless belt 64 is trained about one pair of aligned drums 58 and 60 and a second endless belt 66 is trained about a second pair of aligned drums 58 and 60. A plurality of carriers or containers 68 are arranged in an evenly spaced relation on the endless belt 64 so that they travel with the belt 64 for receiving formed plastic parts from the machine 10. A plurality of similar carriers or containers 70 are also mounted on the endless belt 66 so that they travel with the belt and likewise receive formed plastic parts from the machine 10. As shown in FIG. 8, the carriers 68 and 70 are arranged in a staggered relation for a purpose to appear later.

The platen assembly 16 consists of a pair of end platens 72 and 74 and a center platen 76 which are slidably supported on tie bars 78 carried by upright support plates 80 and 82. A pair of hydraulic cylinder assemblies 84 and 86 are mounted on the support plates 80 and 82, respectively, and are connected to the platens 72, 74 and 76 so that they are operable to reciprocate the platens on the tie bars 78. Since the details of the platen assembly 16 form no part of the present invention, the platen assembly 16 is not described in detail herein and reference is made to applicant's copending application, Serial No. 84,306, filed January 23, 1961, now Patent No. 3,063,092 for such a detailed description.

The end platen 72 and the center platen 76 carry a pair of mold sections 88 which engage to form a single cavity mold which is vertically aligned with the carriers 68 on the endless belt 64. When the platens 72 and 76 are moved apart as shown in FIG. 1, to release the molded plastic part formed thereby, the part falls into a carrier 68 on the belt 64. Likewise, the end platen 74 and the center platen 76 carry a pair of cooperating mold sections 90 which, when they are engaged as shown in FIG. 1, cooperate to form a single cavity mold which is vertically aligned with the carriers 70 on the endless belt 66. When the mold sections 90 are moved apart, the completed plastic part which has been formed in the mold sections 90 falls downwardly into a carrier 70 for transport on the conveyor 18.

The platen support plates 80 and 82 are mounted on the upper ends of a pair of supporting arms 92 and 94 (FIGS. 1 and 3) which are guidably mounted on a pair of main frame columns 28 and are supported on a pair of vertically adjustable jack assemblies 96 carried by the base 20. Since the arms 92 and 94 are supported in an identical manner on the main frame 12 only the support of the arm 94 will be described in detail.

As shown in FIG. 7 a column 28 consists of a pair of upright channel members 98 which are arranged toe-to-toe and are spaced apart to form a slot 100 in the front side of the column 28. A bar 101 connects the rear sides of the channels which are also connected by cross braces 103. The support arm 96 includes a flange 102 which extends vertically adjacent the front side of the column 28 and is secured by bolts 104 to a guide plate 106 which is spaced horizontally from the flange 102 and is disposed within the column 28. The flange 102 and the plate 106 thus cooperate to guide the up and down movement of the arm 94 on the column 28. At a position spaced forwardly from the column 28, the arm 94 is formed with a horizontal bottom surface 108 which is supported on the upper end of one of the jack assemblies 96.

The assembly 96 (FIG. 2) consists of an upright screw or jack shaft 110 which is engaged at its upper end with the surface 108 and is threadably supported in a nut 112 which is mounted in a casing 114 secured to one of the frame side members 24. The nut 112 is rotatably mounted on bearings 116 in the casing 114 and is held against vertical movement by the casing 114. The external surface of the nut 112 is formed with worm teeth 118 which mesh with a worm 120 mounted on a shaft 122 that is journaled on the casings 114 and is provided at one end with a hand wheel 124. A tubular housing member 126 carried by the casing 114 surrounds the shaft 110 and extends upwardly into telescoping relation with a second tubular housing member 128 carried by the arm 94 and extended downwardly therefrom.

On rotation of the shaft 122, the nut 112 is rotated so as to move the jack shaft 110 vertically to in turn raise or lower the arm 94 depending on the direction of rotation of the shaft 122. Since the jack assemblies 96 are identical and since they are both actuated by rotation of the shaft 122, they operate in unison to raise and lower the arms 92 and 94 in unison to in turn raise and lower the platen supporting plates 80 and 82 concurrently to thus maintain a predetermined horizontal alignment of the mold sections 88 and 90.

The die head and extruder assembly 14 includes a die head 130 which is mounted on the main frame 12 so that it is supplied with heated plastic in a semi-fluid condition from an extruder 132 which receives bulk plastic from the usual hopper 131. The extruder 132 is driven by a motor 134 which is mounted on a support plate 136 carried by a pair of the columns 28, and the motor 134, extruder 132 and die head 130, along with the extruder drive mechanism which is hereinafter described, constitute the die head and extruder assembly 14 which is mounted on the main frame 12 in a manner to be hereinafter described.

A pair of substantially horizontal guide rods 138 are secured by connectors 140 to the columns 28 so that the rods 138 are in a substantially parallel spaced relation as shown in FIG. 6. Each connector 140 is formed with a pilot projection 141 (FIG. 6A) which is of a size to fit snugly within the slot 100 and a pair of horizontally aligned grooves 143 (FIG. 1) formed in the channels on opposite sides of the slot 100. The grooves 143 are arranged in horizontally aligned pairs on the columns 28 so that the connectors 140 can be located at vertically spaced positions on the frame 12 to locate the horizontal guide bars 138 at a desired height on the frame 12. Clamp plates 145, disposed within the columns 28, are secured by bolts 147 to the connectors 140 so as to clamp the connectors 140 to the columns 28.

The front end portions 146 of the guide rods 138 are threaded and are of a reduced diameter (FIG. 6) so as to form vertical shoulders 148 on the rods 138. A front yoke 142 (FIG. 16) is formed with a pair of horizontally spaced bosses 144 through which the front end portions 146 of the guide rods 138 extend. The rear sides of the bosses 144 abut the shoulders 148 and are maintained in these positions by nuts 150 threaded on the guide rod portions 146. As a result, the front yoke 142 is securely fixed on the main frame 12.

The extruder 132 consists of a tubular barrel or casing 152 provided with an inner lining 154 and encircled by external band heating elements 156 which function to heat plastic in the barrel 152 and maintain it in a soft semi-fluid condition, and a screw 158 provided with a helical thread 160 and positioned axially within the barrel 152. An inlet opening 160 in the barrel 152 adjacent its rear end communicates with the hopper 131 so that bulk plastic material in the hopper 131 can flow into the extruder 132. The screw 158 extends from the opening 160 in the barrel 152 to the forward end of the barrel which is formed with a radially outwardly extending flange 162. The forward end of the barrel 152 is supported in a central slot 166 in the yoke 142 and the flange 162 is secured to the front side of the yoke 142 by bolts 168.

The rear end of the barrel 152 is provided with a radially outwardly extending flange 170 which is secured by bolts 172 to the housing 174 of a bearing unit 176. The screw 158 is integrally formed with a rearward shaft extension 178 which is rotatably supported in an axial bushing 180 carried by the bearing unit 176 also includes a radial bearing 182 and a thrust bearing 184. As shown in FIG. 6 the housing 174 for the bearing unit 176 is formed with spaced horizontal openings 175 of a size to loosely fit on the guide rods 138 so that the housing 174 is slidably supported on the guide rods 138. A second bearing unit 186, spaced axially of the shaft 178 from the unit 176, includes a housing 196 formed with spaced horizontal openings 190 through which the guide rods 138 extend for slidably supporting the unit 186 on the guide rods 138. The unit 186 has an axial bushing 192 in which the shaft 178 is supported and a radial bearing 194 which supports the bushing 192 in the housing 196.

It can thus be seen that the extruder barrel 152, which contracts and expands as it is heated and cooled, is rigidly mounted at its front end on the yoke 142 which is secured to the main frame 12. At its rear end the barrel 152 is secured to the bearing unit 176 which is slidably supported on the guide rods 138. Consequently, on expansion and contraction of the barrel 152, the bearing unit 176 merely slides axially on the guide bars 138, while still performing its function of supporting the extruder screw shaft 178, and there is no tendency of the barrel 152 to deform or move at its front end so as to affect the fixed mounting of the yoke 142.

The shaft 178 is driven, to rotate the screw 158, by a power transmission unit, indicated generally at 200. The unit 200 consists of a pair of spaced hubs 202 and 204 and a plurality of drive belts 206 which frictionally engage and are extended about the hub 202 and 204. The hub 202 is connected to the shaft 178 and the hub 204 is connected to a shaft 208 disposed below the shaft 178. The shaft 208 is supported in a pair of horizontally spaced hanger units 210 which are slidably supported on the guide rods 138 on opposite sides of the transmission unit 200. A hanger unit 210 (FIG. 14) consists of an elongated arm 212 which is formed at its upper end with a tubular boss 214 having an opening 216 through which a guide rod 138 extends and is formed at its lower end with a tubular boss 218 having an opening 220 in which the shaft 208 is rotatably supported. A projection 222 on one side of the boss is formed with a socket in which a ball 224 on the lower end of a threaded stud 226 is retained by a cap plate 228. The upper end of the stud 226 is threadably mounted in a projection 230 formed on a tubular member 232 having an opening 234 through which the other guide bar 138 extends. It can thus be seen that the shaft 208 is supported by the hanger units 210 on the guide rods 138 and that the threaded studs 226 may be rotated to adjust the tension in the belts 206 to provide the desired drive of the hub 202 in response to rotation of the hub 204. The hub 202 engages one side of a spacer 203 which is engaged at its opposite side with the bearing unit 176 and is slidably mounted on the shaft 178. The portions 214 and 232 of the hanger unit 210 which is adjacent the bearing unit 176 engage one side of the bearing unit as shown in FIG. 6.

The shaft 208 is connected to the drive shaft 236 for the motor 134 by a connecting shaft assembly 238 (FIG. 5). The shaft assembly 238 consists of a first universal joint 240 connected to the shaft 208 and to a hollow shaft 246. A smaller shaft 242 has spline teeth 244 on one end which fit within longitudinal grooves formed in the internal surface of the tubular shaft 246. The opposite end of shaft 242 is connected to a second universal joint 248 that is also connected to the motor drive shaft 236. A seal 250 for the telescoping shafts 244 and 246 is maintained in a position extending about the shaft 242 by an end cap 252.

It can thus be seen that by virtue of the universal joints 240 and 248, the shaft 208 is driven by the motor 134 even though the motor drive shaft 236 and the shaft 208 may not be in axial alignment. This is important because it provides for driving of shaft 208 in all vertically adjusted positions of the assembly 14, with the motor 134 in a fixed position on the frame 12. When the extruder barrel 152 and screw 158 expand, the rear ends thereof move rearwardly to also move the bearing unit 176 rearwardly to in turn move the spacer 203 and hub 202 and the inboard hanger unit 210 rearwardly so as to maintain the hubs 202 and 204 in substantial alignment. The belts 206 also act to maintain the hubs 202 and 204 in substantial alignment. On cooling of the extruder 132, such as on shutdown of machine 10, in the event the hub 202 moves forwardly the belts 206 pull the hub 204, shaft 208 and hanger units 210 forwardly so that hubs 202 and 204 are aligned, when the machine is again operated and during re-heating of the extruder 132. Consequently, the machine 10 can be operated without having to make adjustments for the temperature of the extruder 132. Also, in the assembly 14, the extruder 132 can readily be removed and another extruder having a different length to diameter ratio substituted therefor, in the event this is desirable to improve the performance of the machine 10. The slide mounting of the support for the extruder on the guide bars 138 permits such a ready substitution which may be facilitated by providing rods 138 of a length greater than illustrated if a longer extruder may be required.

The die head 130 consists of a body 260 which is illustrated as being provided with two side-by-side extrusion nozzles 262, one of which is vertically aligned with the mating line of the mold sections 88, when these sections are moved into engagement, and is vertically aligned with the conveyor belt 64, and the other one of which is vertically aligned with the mating line of the mold sections 90 when they are engaged, and the conveyor belt 66. The extrusion nozzle 262 for mold sections 88 is supplied with plastic, such as polyethylene, in a semi-fluid condition from a passage 264 in the body 260 and the extrusion nozzle 262 for mold sections 90 is supplied from a passage 266 in the body 260. The body 260 is also formed with an inlet passage 268 and carries a two-position flow control valve (not shown) controlled by an actuating lever 270. In one position of the valve, it communicates the passages 268 and 264 and in the other position it communicates the passages 268 and 266 so that first one and then the other nozzle 262 is supplied with plastic. It is to be understood that while the die head 130 is illustrated as having a single extrusion nozzle communicating with each of the passages 264 and 266 it can be formed with a plurality of nozzles communicating with each of the passages and in such case the platens carry multiple instead of single cavity molds and the carriers 68 and 70 are arranged in corresponding multiples.

A tubular extension member 272 (FIG. 11) for the body 260 has a reduced diameter threaded section 274 at one end on which a plate 276 is threadably mounted. Bolts 278 connect the plate 276 to the body 260 so that the inlet passage 268 communicates with an axial passage 280 formed in the extension member 272. The extension member 272 is formed with an internal shoulder 282 and a perforated diffusion plate 285 is positioned so that it engages the shoulder 282 and is held in this position by a retainer sleeve 284 having a tapered internal passage 286.

A mounting plate 288 is secured to the rear end of the extension member 272 and is connected to the body 260 by a pair of arms 289 so that the body 260 is cantilever supported from the plate 288. At its lower end, the plate 288 is formed with a slot 290 and at its upper end it is connected to the yoke 142 by a pair of pivot bolt assemblies 292. Each of the pivot bolt assemblies includes a stub shaft 294 which is supported in a pair of spaced upright ears 296 carried by the yoke 142. A tubular hub 298 is secured to the shaft 294 between the ears 296 and carries a threaded stud 300 which extends through the mounting plate 288. The pivot assemblies 292 are arranged so that the stub shafts 294 are axially aligned so that the plate 288 can be pivoted up and down about the aligned shafts.

A pivot assembly 310 connects the lower end of the mounting plate 288 to the yoke 142. The pivot assembly 310 is similar to the pivot assemblies 292 and includes a stub shaft 312 carried by a pair of downwardly extending horizontally spaced ears 314 formed on the yoke 142. A tubular hub 316 mounted on the shaft 312 between the ears 314 carries a threaded stud 318 which is movable to a position in which it extends through the slot 290 in the mounting plate 288. A nut 320 on the stud 318 is engageable with the mounting plate 288 on opposite sides of the slot 290.

When the mounting plate 288 is moved to its position illustrated in FIG. 11 in which it faces the end flange 162 on the extruder barrel 152, a pilot flange 323 on the rear end 322 of the diffusion plate retaining sleeve 284 extends into a counterbore cavity 325 in the front end of the cylinder barrel 152. The nuts 302 and 320 for the pivot assemblies 292 and 310, respectively, may then be tightened to clamp the flange 323 against the front end of the barrel 152 so that the passage 286 in the sleeve 284 is axially aligned with the barrel 152 and the diffusion plate 285 is firmly held against the shoulder 282. Heated plastic in the barrel 152 can then be forced by the screw 158 through the openings in the diffusion plate 285 into the inlet passage 268 in the die head body 260 for alternate flow through the passages 264 and 266 to the extrusion nozzles 262.

The diffusion plate 285 is subject to being clogged with contaminants in the heated plastic material used for molding. Also, access to the extrusion nozzles 262 for adjustment and repair, when they extend downwardly, is difficult because they must be approached from below. In the machine of this invention, access to the diffusion plate 285 and the nozzles 262 is facilitated by virtue of the pivotal mounting of the die head on the yoke 142. This access is obtained by first loosening the nut 320 in the pivot assembly 310 so that the threaded stud 318 can be swung downwardly about the shaft 312 to a position clear of the slot 290 as shown in FIG. 12. The nuts 302 for the pivot assemblies 292 are loosened and the mounting plate 288 is then swung upwardly about the axially aligned stub shafts 294 to a position in which the mounting plate 288 is spaced from the extruder flange 162 as shown in FIG. 12. The retainer sleeve 284 can then be removed so that the diffusion plate 285 can be removed for cleaning or replacement.

In this position of the mounting plate 288, the nozzles 262 are also readily accessible for repair or adjustment. When the repairs and adjustments have been completed, the mounting plate 288 is swung downwardly about the stub shafts 294 to the position shown in FIG. 11 and the nuts 302 and 320 are again tightened to clamp the sleeve 284 to the outlet end of the extruder barrel 152.

In the operation of the machine 10, plastic supplied to the extruder 132 from the hopper 131 in bulk granular form is heated in the extruder 132 so that it is conveyed by the screw 158 to the die head body 260 in a heated semi-fluid condition. Plastic in this condition is forced by the screw 158 through the inlet passage 268 in the die head body 260 to the flow control valve (not shown) which directs the plastic into the passage 264 where it flows to the extrusion nozzle 262 positioned above the mold sections 88. Plastic is extruded downwardly through the nozzle 262 in a tubular form so as to form a tubular downwardly extending parison at the nozzle 262. When the parison is of the desired length, an automatic control mechanism (not shown) for the machine 10 provides for actuation of the lever 270 for the flow control valve to shut off the flow of plastic from the inlet passage 268 to the passage 264 and provide for a flow of plastic from the inlet passage 268 to the passage 266.

Concurrently with the final portion of the extrusion of the tubular parison from the nozzle 262 corresponding to the passage 264, the mold sections 88 are being moved toward the parison being formed so that when the formation of the parison is completed, the molds 88 engage to form a mold cavity surrounding the parison. Air is then blown into the parison so as to expand it outwardly into conformity with the surrounding mold cavity concurrently with the formation of a second parison at the nozzle 262 being supplied with plastic from the passage 266.

After the parison has been blown into conformity with the mold cavity defined by the sections 88, and after a predetermined time period for cooling of the formed plastic part, the platens 72, 74 and 76 are actuated so that the molds 88 are moved apart and the molds 90 are moved toward each other. Prior to engagement of the molds 90, the parison formed by plastic from passage 266 has been completed and the control lever 270 for the flow control valve is actuated to shut off the flow of plastic to the passage 266 and provide for a flow of plastic into the passage 264, and the completed plastic part formed by the mold sections 88 is stripped from its nozzle 262 so that it falls downwardly into a carrier 68 on the conveyor 18. The conveyor 18 is operated so that the carrier 68 is in a position to receive the formed part when it is stripped from its nozzle 262 by a stripper mechanism (not shown).

During the formation of the next parison at the extrusion nozzle 262 for the mold sections 88, the parison surrounded by the mold cavity defined by the mold sections 90 is blown into conformity with the mold cavity and after a predetermined time period the platens 72, 74 and 76 are actuated so that the mold sections 88 are moved toward each other, the mold sections 90 are moved apart, and the part formed in the mold sections 90 is stripped from its nozzle 262, and the above sequence is then repeated. When the molded plastic part formed by the mold sections 90 is stripped from its extrusion nozzle 262 by the stripper mechanism (not shown) it falls downwardly into a carrier 70 on the conveyor 18. Since the plastic parts are alternately formed at the two nozzles 262 the carriers 68 and 70 are staggered on the conveyor 18.

The conveyor 18 is operated intermittently so that its movement is coordinated with the movement of the platens to assure a location of the carriers 68 and 70 below the plastic parts as they drop downwardly from the nozzles 262. To assure a retention of the parts in the carriers, the carriers may be increased in height, the machine parts may be adjusted to locate the carriers closer to the nozzles 262, and/or auxiliary guiding devices (not shown) may be used to funnel the parts into the carriers. The drive means for the conveyor 18, illustrated as the motor 54, may be either mechanically or electrically connected to the platens to assure the desired coordination of movement of the conveyor 18 and the platens.

A modified form of the machine 10 is illustrated in FIG. 17 and is indicated generally at 10a. Since the machine 10a is in many respects similar to the machine 10, numerals with the letter suffix "a" are used on the machine 10a to indicate similarly numbered parts without the letter suffix on the machine 10. In general, the machine 10a consists of a main frame having one or more vertically extending die head and extruder assemblies mounted thereon and associated with a platen assembly and a conveyor, and illustrated as having two die head and extruder assemblies. As a result of the vertical arrangement of the die head and extruder assemblies, the machine 10a is particularly adapted for installation in factories in which considerable vertical space is available, such as factories having peaked roofs.

The machine 10a includes a pair of vertically extending die head and extruder assemblies 14a mounted on a main frame 12a which is provided with a pair of adjustable conveyors 18a and vertically adjustable platen assemblies 16a corresponding to the assemblies 14a. Each die head and extruder assembly 14a is mounted on a pair of vertically extending guide rods 138a, only one of which is shown, which are mounted on the upper end of the main frame 12a by means of mounting brackets 350. Each mounting bracket 350 is secured to the main frame 12a at one of its ends by mounting bolts 352 and is provided at its opposite end with a tubular clamp 354 which is secured to a guide rod 138a for supporting the guide rod 138a at a desired height on the machine frame 12a. A mounting plate 288a is pivotally mounted on stub shafts 292a on a yoke 142a which is rigidly mounted on the bottom ends of the guide rods 138a. The mounting plate 288a supports a die head body 260a so that the body 260a can be swung about the stub shafts 292a to a position in which the extrusion nozzles 262 are accessible for repair and replacement.

Each extruder and die head assembly also includes an extruder 132a which is driven by a motor 134a secured to the upper end of the frame 12a and is supplied with bulk plastic from a hopper 131a. A bearing unit 176a supports the upper end of the extruder 132a and is slidably mounted on the guide rods 138a so that on expansion and contraction of the extruder 132a, the end thereof remote from the die head body 260a can move axially. The extruder shaft is driven by a power transmission assembly 200a which is driven from the motor drive shaft 236a by a drive shaft assembly 238a. The hub 202a in the transmission assembly 200a is secured to the extruder drive shaft and the hub 204a is secured to an idler shaft 208a which is supported on the guide rods 138a by hanger units 210a. In the assembly 14a spacer sleeves 362 are slidably mounted on the guide rods 138a between the hanger units 210a to prevent the upper unit 210a from sliding downwardly on the rods 138a. A washer 360 is positioned on the shaft 208a at a position between the lower hanger unit 210a and the hub 204a to prevent the hub 204a and the shaft 208a, to which it is secured, from sliding downwardly to a position in which the hub 204a is out of alignment with the hub 202a.

As a result, on contraction and expansion of the extruder 132a, the movement thereof on the guide rods 138a is confined to the upper end of the extruder and the extrusion nozzles 262 remain in fixed positions.

It can thus be seen that the machine 10a includes the advantages present in the machine 10a, namely, the predetermined fixed vertical alignment of the extrusion nozzles 262 with the platen assembly 16a and the carriers on the conveyor 18a and the provision for expansion and contraction of the extruder 132a without affecting this alignment. As a result, a die head and extruder assembly 14, platen assembly 16 and conveyor 18 can be installed on a main frame 12 to provide either a machine 10 or a machine 10a, depending on which machine would make the best use of available factory space.

By virtue of the inclusion in each of the machines 10 and 10a of an independent conveyor for the die heads, which is mounted directly on the machine frame, a conditioning chamber can be readily mounted on the frame so as to enclose a portion of the conveyor. Such a chamber is useful in accelerating the setting, curing or treating of the plastic in the formed parts to reduce the time required between molding and packaging of completed plastic parts. As an example, such a zone can be used to dry and cool the completed plastic parts so that they can be handled at the discharge end of the conveyor. The platform and ladder units 30 and 30a are located so the platforms 32 and 32a are positioned such that maintenance personnel can readily observe and obtain access to the upper working parts of the machines 10 and 10a.

It will be understood that the molding machine which is herein disclosed and described is presented for purposes of explanation and illustration and is not intended to indicate limits of the invention, the scope of whch is defined by the following claims.

What is claimed is:

1. In a molding machine having a main frame, a conveyor for a heated plastic material fixed at one of its ends on said frame, guide bar means mounted on said frame, means slidably mounted on said guide bar means and arranged in a supporting relation with said conveyor at a position spaced from said one end thereof, power transmission means for said conveyor attached thereto and supported on said guide bar means, and drive means for said conveyor mounted on said main frame and movably connected to said power transmission means.

2. In a molding machine having a main frame and an extruder for a heated plastic material, said extruder including a hollow barrel and a rotatable screw mounted axially therein, means rigidly mounting one end of said barrel on said frame, guide bar means mounted on said frame, means slidably mounted on said guide bar means and arranged in a supporting relation with said barrel at a position spaced from said one end thereof, and means mounted on said frame and drivingly connected to said screw.

3. In a molding machine having a main frame, a tubular barrel having a pair of ends one of which is fixed on said frame, a rotatable screw in said barrel for feeding heated plastic toward said one end thereof, guide bar means mounted on said frame in a substantially parallel relation with said barrel, means slidably mounted on said guide bar means and arranged in a supporting relation with said barrel adjacent the opposite end thereof whereby on expansion and contraction of said barrel said opposite end thereof is movable with said supporting means longitudinally of said guide bar means, and means arranged in a driving relation with said screw and movable longitudinally of said guide bar means.

4. In a molding machine having a main frame, a tubular barrel having a pair of ends one of which is fixed on said frame, a rotatable screw in said barrel for feeding heated plastic toward said one end thereof, guide bar means mounted on said frame in a substantially parallel relation with said barrel, means slidably mounted on said guide bar means and arranged in a supporting relation with said screw and with the opposite end of said barrel whereby on expansion and contraction of said barrel said opposite end thereof is movable with said supporting means longitudinally of said guide bar means, and means arranged in a driving relation with said screw and movable longitudinally of said guide bar means.

5. In a molding machine having a main frame, a tubular barrel having a pair of ends one of which is fixed on said frame, a rotatable screw in said barrel for feeding heated plastic toward said one end thereof, guide bar means mounted on said frame in a substantially parallel relation with said barrel, means slidably mounted on said guide bar means and arranged in a supporting relation with the opposite end of said barrel whereby on expansion and contraction of said barrel said opposite end thereof is movable with said supporting means longitudinally of said guide bar means, a drive shaft for said screw rotatably supported in said slidably mounted barrel supporting means, and means arranged in a driving relation with said drive shaft and movable longitudinally of said guide bar means.

6. In a molding machine having a main frame, a tubular barrel having a pair of ends one of which is fixed on said frame, a rotatable screw in said barrel for feeding heated plastic toward said one end thereof, guide bar means mounted on said frame in a substantially parallel relation with said barrel, means slidably mounted on said guide bar means and arranged in a supporting relation with the opposite end of said barrel whereby on expansion and contraction of said barrel said opposite end thereof is movable with said supporting means longitudinally of said guide bar means, shaft means connected to said screw and external of said barrel, power means on said main frame, power transmission means drivingly connected to said shaft means and slidably supported on said guide bar means, and extensible shaft means connected to and extending between said power means and said power transmission means.

7. In a molding machine having a main frame, a tubular barrel having a pair of ends one of which is fixed on said frame, a rotatable screw in said barrel for feeding heated plastic toward said one end thereof, guide bar means mounted on said frame in a substantially parallel relation with said barrel, means slidably mounted on said guide bar means and arranged in a supporting relation with the opposite end of said barrel whereby on expansion and contraction of said barrel said opposite end thereof is movable with said supporting means longitudinally of said guide bar means, drive shaft means for said screw arranged external of said barrel, a motor mounted on said main frame, power transmission means drivingly connected to said drive shaft means and slidably supported on said guide bar means, said power transmission means including a pair of belt connected hubs one of which is secured to said drive shaft means and the other of which is spaced from said drive shaft means, and extensible shaft means connected to and extending between said motor and said other hub.

8. In a molding machine having a main frame, a die head including at least one extrusion nozzle adapted to be supplied with plastic in a semi-fluid condition, means including a tubular barrel having a pair of ends for supplying heated plastic in a semi-fluid condition to said die head, means rigidly mounting said die head and said barrel on said frame so that one end of said barrel communicates with said die head so that said barrel is adapted to supply plastic to said die head, guide bar means mounted on said frame in a substantially parallel relation with said barrel, and means slidably mounted on said guide bar means and arranged in a supporting relation with the opposite end of said barrel whereby on expansion and contraction of said barrel said opposite end thereof is movable with said supporting means longitudinally of said guide bar means.

9. In a blow molding machine having a main frame, die head means rigidly mounted on said frame for forming a downwardly extending tubular parison when plastic in a semi-fluid condition is moved therethrough, means for supplying plastic in a semi-fluid condition to said die head means including a tubular barrel and a rotatable screw positioned in said barrel, means attaching one end of said barrel to said die head means, heating means operatively associated with said barrel for heating plastic therein, guide bar means rigidly mounted on said frame and arranged in a substantially parallel relation with said barrel, support means slidably mounted on said guide bar means and arranged in a supporting relation with the opposite end of said barrel for sliding movement longitudinally of said guide bar means in response to axial expansion and contraction of said barrel, a drive shaft for said screw external of said casing, first drive means secured to said shaft, second drive means spaced from said shaft and slidably supported on said guide bar means, means extending between said drive means providing for rotation of said first drive means in response to rotation of said second drive means, shaft means arranged in a driving relation with said second drive means, a motor mounted on said frame and provided with a drive shaft, and a connecting shaft assembly comprising a pair of spline connected shaft members providing for axial extension and retraction of said shaft assembly, universal joint means connecting opposite ends of said shaft assembly to said motor drive shaft and said shaft means.

10. In a blow molding machine having a main frame, die head means rigidly mounted on said frame for forming a downwardly extending tubular parison when plastic in a semi-fluid condition is moved therethrough, means for supplying plastic in a semi-fluid condition to said die head means including a tubular barrel and a rotatable screw positioned in said barrel, means attaching one end of said barrel to said die head means, heating means operatively associated with said barrel for heating plastic therein, guide bar means rigidly mounted on said frame and arranged in a substantially parallel relation with said barrel, support means slidably mounted on said guide bar means and arranged in a supporting relation with the opposite end of said barrel for sliding movement longitudinally of said guide bar means in response to axial expansion and contraction of said barrel, a drive shaft for said screw external of said barrel, first drive means secured to said shaft, second drive means spaced from said shaft and slidably supported on said guide bar, means extending between said drive means providing for rotation of said first drive means in response to rotation of said second drive means, shaft means arranged in a driving relation with said second drive means, a motor mounted on said frame and provided with a drive shaft, a connecting shaft assembly comprising a pair of spline connected shaft members providing for axial extension and retraction of said shaft assembly, universal joint means connecting opposite ends of said shaft assembly to said motor drive shaft and said shaft means, a platen assembly mounted on said main frame at a position below said die head means, said assembly including a plurality of movable platen members adapted to carry cooperating mold sections in vertical alignment with said die head means, and means mounting said platen assembly on said main frame for adjustable vertical movement relative to said die head means.

11. In a blow molding machine having a main frame, die head means rigidly mounted on said frame for forming a downwardly extending tubular parison when plastic in a semi-fluid condition is moved therethrough, means for supplying plastic in a semi-fluid condition to said die head means including a tubular barrel and a rotatable screw positioned in said barrel, means attaching one end of said barrel to said die head means, heating means operatively associated with said barrel for heating plastic therein, guide bar means rigidly mounted on said frame and arranged in a substantially parallel relation with said barrel, support means slidably mounted on said guide bar means and arranged in a supporting relation with the opposite end of said barrel for sliding movement longitudinally of said guide bar means in response to axial expansion and contraction of said barrel, a drive shaft for said screw external of said barrel, first drive means secured to said shaft, second drive means spaced from said shaft and slidably supported on said guide bar means for movement with said first drive means in response to axial expansion and contraction of said drive shaft, means extending between said drive means providing for rotation of said first drive means in response to rotation of said second drive means, shaft means arranged in a driving relation with said second drive means, a motor mounted on said frame and provided with a drive shaft, a connecting shaft assembly comprising a pair of spline connected shaft members providing for axial extension and retraction of said shaft assembly, universal joint means connecting opposite ends of said shaft assembly to said motor drive and said shaft means, a platen assembly mounted on said main frame at a position below said die head means, said assembly including a plurality of movable platen members adapted to carry cooperating mold sections in vertical alignment with said die head means, and conveyor means mounted on said main frame below said platen assembly and in vertical alignment with said mold sections and said die head means.

12. In a blow molding machine having a main frame, die head means rigidly mounted on said frame and including at least one downwardly extending extrusion nozzle for forming a downwardly extending tubular parison when plastic in a semi-fluid condition is moved therethrough, means for supplying plastic in a semi-fluid condition to said die head means including a substantially horizontal tubular barrel and a rotatable screw positioned in said barrel, means attaching one end of said barrel to said die head means, heating means operatively associated with said barrel for heating plastic therein, guide bar means rigidly mounted on said frame and arranged in a substantially parallel relation with said barrel, support means slidably mounted on said guide bar means and arranged in a supporting relation with the opposite end of said barrel for sliding movement longitudinally of said guide bar means in response to axial expansion and contraction of said barrel, a drive shaft for said screw external of said barrel, means on said main frame for driving said drive shaft, a platen assembly mounted on said main frame at a position below said die head means, said assembly including a plurality of movable platen members provided with cooperating mold sections adapted to be moved into vertical alignment with said extrusion nozzle, means mounting said platen assembly on said main frame for adjustable vertical movement relative to said die head means, and a conveyor for plastic parts formed in said mold sections mounted on said main frame below said platen assembly and in vertical alignment with said extrusion nozzle.

13. In a blow molding machine, a main frame comprising a base and upstanding columns mounted on said base, a die head and extruder assembly comprising a plurality of substantially horizontal guide rods releasably secured to said columns, a die head rigidly mounted on said guide rods and provided with at least one downwardly extending extrusion nozzle, means including a tubular barrel for supplying heated plastic in a semi-fluid condition to said die head, means rigidly securing the outlet end of said barrel to said die head, and means slidably mounted on said guide rods and arranged in a supporting relation with the opposite end of said barrel so that on heating of said barrel the axial expansion thereof is in a direction from said outlet end toward said opposite end so that the position of said die head is unaffected by said expansion.

References Cited in the file of this patent

UNITED STATES PATENTS

| | | |
|---|---|---|
| 2,633,602 | Sverdrup | Apr. 7, 1953 |
| 2,724,860 | Strong | Nov. 29, 1955 |
| 2,765,491 | Magerkurth | Oct. 9, 1956 |
| 2,780,835 | Sherman | Feb. 12, 1957 |
| 2,854,691 | Strong | Oct. 7, 1958 |
| 2,946,089 | Heston | July 26, 1960 |
| 3,009,198 | Kalman et al. | Nov. 21, 1961 |
| 3,028,624 | Parfrey et al. | Apr. 10, 1962 |
| 3,044,112 | Perry | July 17, 1962 |

FOREIGN PATENTS

| | | |
|---|---|---|
| 203,875 | Australia | Apr. 7, 1955 |